United States Patent
Vadgama et al.

(10) Patent No.: US 9,440,605 B2
(45) Date of Patent: Sep. 13, 2016

(54) CONFIGURABLE RENTAL VEHICLE

(71) Applicant: FUJITSU LIMITED, Kawasaki-shi, Kanagawa (JP)

(72) Inventors: Sunil Keshavji Vadgama, Ashford Middlesex (GB); Yiwei Fang, High Wycombe (GB)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/755,113

(22) Filed: Jun. 30, 2015

(65) Prior Publication Data

US 2016/0001720 A1   Jan. 7, 2016

(30) Foreign Application Priority Data

Jul. 4, 2014  (EP) .................................... 14175779

(51) Int. Cl.
| | | |
|---|---|---|
| *B60R 16/037* | (2006.01) | |
| *G06Q 30/06* | (2012.01) | |
| *G07C 5/00* | (2006.01) | |
| *H04B 5/00* | (2006.01) | |
| *H04M 1/725* | (2006.01) | |
| *H04W 4/00* | (2009.01) | |

(52) U.S. Cl.
CPC ......... *B60R 16/037* (2013.01); *G06Q 30/0645* (2013.01); *G07C 5/008* (2013.01); *H04B 5/0031* (2013.01); *H04M 1/72533* (2013.01); *H04W 4/008* (2013.01)

(58) Field of Classification Search
CPC .............................. B60R 16/037; H04W 48/04
See application file for complete search history.

(56) References Cited

U.S. PATENT DOCUMENTS

| | | | |
|---|---|---|---|
| 6,985,802 B2 * | 1/2006 | Hedges | G06F 11/2268 701/33.4 |
| 7,761,062 B2 | 7/2010 | Mervine | |
| 8,548,675 B2 * | 10/2013 | Yamaura | B62D 5/0493 701/34.4 |
| 9,037,572 B2 * | 5/2015 | Jones | G07C 5/008 701/36 |
| 2004/0167689 A1 | 8/2004 | Bromley et al. | |
| 2005/0060070 A1 | 3/2005 | Kapolka et al. | |
| 2005/0065678 A1 * | 3/2005 | Smith | G07C 5/008 701/31.4 |
| 2006/0109107 A1 * | 5/2006 | Staton | B60R 25/00 340/539.13 |
| 2007/0073908 A1 * | 3/2007 | Gormley | G05B 19/0421 710/8 |

(Continued)

FOREIGN PATENT DOCUMENTS

| | | |
|---|---|---|
| EP | 1 961 624 A1 | 8/2008 |
| EP | 2 228 270 A1 | 9/2010 |

(Continued)

OTHER PUBLICATIONS

European Search Report mailed Jan. 21, 2015, in corresponding European Application No. 1415779.9.

(Continued)

*Primary Examiner* — Thomas Tarcza
*Assistant Examiner* — Alex C Dunn
(74) *Attorney, Agent, or Firm* — Staas & Halsey LLP

(57) ABSTRACT

A rental vehicle has features that can be activated or deactivated wirelessly. Additional features can be purchased and activated after a customer has paid for an initial set of features and started to use the vehicle. Configuration of the vehicle is automated by transmitting a configuration message to the vehicle.

16 Claims, 3 Drawing Sheets

(56) References Cited

U.S. PATENT DOCUMENTS

| | | | |
|---|---|---|---|
| 2008/0039998 A1 | 2/2008 | Fein et al. | |
| 2012/0105197 A1 | 5/2012 | Kobres | |
| 2013/0226392 A1* | 8/2013 | Schneider | F01M 11/10 701/29.5 |
| 2013/0282277 A1* | 10/2013 | Rubin | G08G 9/02 701/517 |
| 2013/0297099 A1 | 11/2013 | Rovik | |
| 2014/0047347 A1* | 2/2014 | Mohn | G08G 1/00 715/738 |
| 2014/0309891 A1* | 10/2014 | Ricci | H04W 48/04 701/48 |
| 2015/0153175 A1* | 6/2015 | Skaaksrud | H04W 12/06 701/23 |

FOREIGN PATENT DOCUMENTS

| | | |
|---|---|---|
| WO | WO 2007/038839 A1 | 4/2007 |
| WO | WO 2013/001254 A1 | 1/2013 |

OTHER PUBLICATIONS

European Office Action issued Oct. 28, 2015 in corresponding European Patent Application No. 14 175 779.9, 10 pages.

* cited by examiner

CONFIGURABLE RENTAL VEHICLE

CROSS-REFERENCE TO RELATED APPLICATION

This application claims the benefit of European Application No. 14175779.9, filed Jul. 4, 2014, the disclosure of which is incorporated herein by reference.

FIELD

The present application relates to vehicle rental in which a customer applies to a vehicle rental agency for temporary use of a vehicle. More particularly, the present application relates to technologies for facilitating and improving flexibility of such vehicle rental.

BACKGROUND

A vehicle rental or vehicle hire agency is a company that rents cars, vans, trucks and the like for short periods of time ranging from several hours to several days or weeks in exchange for a fee. Vehicle rental agencies range from individual stores to national chains. The larger national chains are often organized with multiple local branches in a geographical region, which allows a user to return a vehicle to a location other than from where the vehicle is released.

The customer base for the vehicle rental agencies is mainly people who have a vehicle that is temporarily not accessible, for example, travelers to other regions who have not brought their own vehicle, or those whose vehicles are being serviced or repaired, as well as people who have a temporary need for a vehicle larger than their own.

In addition to renting out basic vehicles with basic features, rental agencies may also offer vehicles with advanced features such as 1) Infotainment functions, such as global positioning system (GPS) navigation, multimedia entertainment systems, traffic information receiver and 2) Additional Safety related features such as lane departure warning, collision avoidance, rear view cameras, adaptive cruise control, etc.

There are various drawbacks with the conventional vehicle rental process.

A significant number of the vehicles rented in the current rental industry are base model vehicles, sometimes provided with a value adding service such as a portable GPS device. Many of the rental agencies do not stock vehicles with a lot of advanced built-in features. This can be because they are more expensive for the rental agency to purchase and rent less frequently due to the higher rental premium. Therefore these more advanced vehicles are likely to represent higher capital expenditure and upkeep cost. Another practical consideration is that by stocking only the base vehicles, there is usually little added risk of turning customers away, as people renting a vehicle for a short term can usually settle for a vehicle that has only basic functions or basically "drives", even if they have additional budget to pay for more advanced models.

Thus, there is the problem that renters of vehicles are not necessarily provided with the features they would like when renting a vehicle, which causes inconveniences and diminishes enjoyment of the vehicle.

Moreover, during the vehicle renting process, a customer's choice of model and features of the vehicle are primarily decided at the point of transaction. Once a customer has collected the key, and started using the vehicle, there is no opportunity to enhance the vehicle features, other than by returning the vehicle and swapping it for another.

In addition, there is the issue that the process of preparing a vehicle is labor-intensive and potentially error-prone. When a rental agency receives the choice of rental vehicle and add-on features, the request will passed to a specific mechanic to manually pick and configure a vehicle, which will account for labor and time cost.

Meanwhile, Near Field Communication (NFC) is a set of standards for smart phones and similar devices to establish radio communication with each other by touching them together or bringing them into close proximity, usually not more than some centimeters apart. Present and anticipated applications include contactless transactions, data exchange, and simplified setup of more complex communications such as Wi-Fi. Communication is also possible between an NFC device and an unpowered NFC chip. Those unpowered chips are usually called NFC tags. NFC tag reading/writing capabilities are integrated onto many recent smart phones.

Vehicular Communication Systems including V2V (vehicle to vehicle) and V2X (vehicle to infrastructure) are an emerging type of networks in which vehicles and roadside units are the communicating nodes; providing each other with information, such as safety warnings and traffic information. V2V and V2X are both technologies which enable intelligent transport communications, the main difference being whether the communication is between vehicles (V2V) or between vehicles and infrastructure (V2X). The two types of system may be mutually supportive, since vehicles can communicate with infrastructure indirectly using other vehicles as relay nodes. As a cooperative approach, vehicular communication systems can be more effective in avoiding accidents and traffic congestion than if each vehicle tries to solve these problems individually. V2V/V2X is also expected to facilitate driver assistance functions up to and including fully-autonomous vehicle operation (self-drive).

Generally vehicular networks are considered to contain two types of nodes; vehicles and roadside stations. One wireless technology proposed for V2V/V2X is Dedicated Short Range Communications (DSRC). DSRC works in 5.9 GHz band with bandwidth of 75 MHz and approximate range of 1000 m. The network should support both private data communications and public (mainly safety) communications but higher priority is given to public communications.

To date, however, such wireless technologies have not been applied to the process of vehicle rental.

SUMMARY

According to a first aspect of the present invention, there is provided a method of wirelessly configuring a vehicle for use of a user comprising:

at a control center, receiving a request from the user to configure the vehicle and responsive thereto, generating a configuration message for wireless communication to the vehicle; and at the vehicle, wirelessly receiving the configuration message and in response thereto, setting at least one function of the vehicle.

Preferably, the method further comprises:

transmitting the request to configure the vehicle at a mobile device of the user; and wirelessly receiving the request at the control center.

Thus, the method is preferably initiated by a request received wirelessly by a mobile device of the user.

In one form of the invention, transmitting the request occurs prior to use of the vehicle by the user. In other words, before the start of the rental, the user specifies the functions which he/she would like to have available, and the control center (rental center) then configures the vehicle accordingly, ready for use. The configuration message can be wirelessly received by the vehicle in various ways, including via a V2V or V2X network, via direct cellular wireless communication with the control center, or through a combination of cellular wireless communication and near-field communication, NFC.

Thus, in a first embodiment, a rental vehicle is equipped with a number of optional infotainment and safety features and it accepts authenticated input commands to activate and deactivate selected features or functions for a specific period of time.

To effect this embodiment, the above mentioned configuration message may specify one or more of:
the vehicle for which the message is intended;
the at least one function to be activated;
the duration for which the at least one function should be effective.

Security information, such as a digital signature or certificate of the control center, is also preferably included. Wireless communication between the control center and vehicle may also be encrypted.

In another form of the invention (which may be combined with the first form), transmitting the request occurs during use of the vehicle by the user. That is, even after the user has already started to use the vehicle, if he/she wishes to add functions to the vehicle, this is possible by transmitting a request to the control center, which responds with the configuration message. Again, the configuration message is conveyed to the vehicle either directly via a wireless communication network (such as a Dedicated Short Range Communications, DSRC, network or wireless cellular network) or indirectly via NFC.

Thus, in a second embodiment, the wireless technology used to transmit the commands is NFC. That is, the configuration message is stored in a storage medium linked to a near-field communication device (NFC tag), and is wirelessly transmitted from the near-field communication device to the vehicle. By integrating a programmable NFC tag onto a car key, and installing a NFC reader in the vehicle, the vehicle may be able to read what features a customer is entitled to use on board the vehicle. The NFC tag can be programmed at the rental agency as the customer pays for an initial set of services. Subsequently it can be reprogrammed using a compatible mobile device such as a smart phone, after a customer obtains authorization by making a payment on their mobile device. To facilitate this process, a smart phone application ("app") can be published by a rental agency.

As a variation of the second embodiment, instead of NFC, car to car or car to infrastructure communication can be used for the wireless activation/deactivation of various features. Also, the mobile payment and feature purchase on-the-fly can also be made using the V2X communication capability—for example by employing the user's mobile phone to communicate with the rental center, which then sends a configuration message over the V2X network.

In any case, preferably, the setting is performed automatically without human intervention. However, this does not exclude the possibility of certain functions requiring some manual intervention for their configuration.

Thus, a fourth embodiment is like the first embodiment, except in addition, once the customer's order is received, the data containing vehicle features and functions from the order is wirelessly transmitted to a soft-configurable destination vehicle, in a fully automated manner, without direct human intervention. The vehicle, upon receipt of the wireless transmission of such configuration information, authenticates the sender and then carries out the soft configuration autonomously.

Preferably, the vehicle confirms the setting back to the control center. This can be done by an acknowledgement signal immediately after the setting, and/or by an "audit" at any later time in which the vehicle reports its configuration to the control center. The control center can compare this with the configuration it has on file for that vehicle, as reflected in the configuration message. Thus, preferably, the method further comprises, after the setting, the vehicle reporting its configuration to the control center; and the control center comparing the reported configuration with a configuration contained in the configuration message.

The at least one function of the vehicle, set in response to the configuration message, may include an infotainment function such as any of:
navigation
audio entertainment
video entertainment
traffic information.

Alternatively or in addition, at least one such function may include a safety assistance function such as any of:
lane departure warning
collision avoidance
rear view camera
adaptive cruise control
traction control
self-driving capability.

Alternatively or in addition, at least one such function may relate to driver comfort and provide any one or more of:
air conditioning
seat heating
seat massage.

Alternatively or in addition, at least one such function of the vehicle relates to driving performance and more particularly to any one or more of:
drive modes
off road ability
traction control
speed limiter.

As already mentioned, the vehicle is preferably in wireless communication with the control center during its use, for example via a DSRC network. This allows the control center to gather statistics about how the vehicle is being driven.

Accordingly, in any method as defined above, there may be further operations, at the control center, of monitoring use of the vehicle and transmitting a personalized information message to the user on the basis of their usage of the vehicle. This feature, which constitutes the third embodiment of the invention, allows a personalized user assistance service to be made available to the customers after they start using the vehicle. The information content may be tailored to a customer's individual circumstances, such as their driving habit, driving route and whether in need of any special assistance. For example, if a driver tends to make heavy use of the brakes, then an information message offering an "automatic braking assistant" can be displayed or broadcasted via the vehicle's infotainment system. It may be possible to judge that the driver is becoming tired, in which case a self-drive mode or other driver assistance feature could be offered. Another example is if the car is driving long distances on the highway or through a desert and passengers are likely to get bored, then an information message may be sent notifying the customer of the available audio/video entertainment options on the vehicle, as they are more likely to be accepted by the customer.

According to a second aspect of the present invention, there is provided a system for wirelessly configuring a vehicle for use by a user comprising:

a mobile device of the user, which is arranged for transmitting a request to configure the vehicle;

a control center, arranged to receive the request and in response thereto, to provide a configuration message for wireless communication to the vehicle; and the vehicle, arranged for wirelessly receiving the configuration message and in response thereto, to set at least one function of the vehicle.

The "control center" referred to here may be a computer of a vehicle rental center (though not necessarily located at the vehicle rental branch where the vehicle is rented).

According to a third aspect of the present invention, there is provided a vehicle comprising:

functional units each arranged to be either in an activated state for providing at least one function, or in a deactivated state;

a control unit capable of being configured selectively to activate one or more of the functional units; and a wireless receiver; wherein the control unit is responsive to a configuration message received by the wireless receiver to activate a functional unit in order to provide the at least one function for a time period specified in the configuration message.

Here, the "control unit" corresponds to the processing and communication unit described below.

According to a fourth aspect of the present invention, there is provided a mobile device for configuring a rented vehicle, comprising:

a receiver for a wireless communication network; and a transmitter for near-field communication, NFC;

the mobile device arranged, in response to receiving a first message over the wireless communication network from a vehicle rental center, to construct a second message and transmit the second message by NFC to a NFC receiver of the vehicle to configure the vehicle.

As may be understood by those skilled in the art, each receiver and transmitter mentioned above is preferably a transceiver (transmitter-receiver), allowing acknowledgement of received messages and feeding back useful information.

Use of such a mobile device is particularly advantageous when reconfiguring a rental vehicle which is already in use, as described elsewhere in this specification.

A further aspect of the present invention provides non-transitory computer-readable recording media on which is stored software which, when executed by a processor of a vehicle control unit, provides the control unit of the vehicle defined in the third aspect; as well as software which, when executed by a processor of a mobile device, provides the mobile device as defined above in the fourth aspect.

In a further aspect, the present invention provides a method of wirelessly configuring a vehicle for use of a user comprising:

at a control center, receiving a request to configure the vehicle and responsive to the request, generating a configuration message for wireless communication to the vehicle; and at the vehicle, wirelessly receiving the configuration message and in response to the configuration message, setting at least one function of the vehicle; characterized in that: the request is generated by the user specifying at least one function which the user would like to have available during said use, the configuration message specifies a time period for activation of the at least one function, and the setting activates the specified function for the specified period of time.

In a still further aspect, the present invention provides a system for wirelessly configuring a vehicle for use by a user comprising:

a control center, arranged to receive a request to configure the vehicle and in response thereto, to provide a configuration message for wireless communication to the vehicle; and the vehicle, arranged for wirelessly receiving the configuration message and in response thereto, to set at least one function of the vehicle; characterized in that a mobile device of the user is employed to generate the request which specifies at least one function which the user would like to have available during said use, the configuration message specifies a time period for activation of the at least one function, and the vehicle is arranged to activate the specified function for the specified period of time.

In this specification, the terms "customer", "user" and "driver" are synonymous unless otherwise demanded by the context. The "user" does not necessarily have to drive the vehicle. For convenience, embodiments of the present invention may be described by reference to "cars", but it may be understood that this is just an example, and the present invention is applicable to other kinds of rental vehicle also.

Thus, embodiments of the present invention provide an innovation towards the vehicle rental service industry. Features of the invention include a method of vehicle soft-configuration by providing a rental vehicle having a range of optional infotainment and safety assistance features or functions available, which can be activated or deactivated through wireless software configuration. A second feature is the ability to purchase and activate additional features on-the-move, i.e. after a customer has paid for an initial set of features and is already on the road, further features can be both paid for and activated wirelessly. A third feature is automation of the vehicle picking and configuration process by transmitting the configuration information wirelessly, to the destination vehicle, taking advantage of the vehicle's soft configuration flexibility.

The benefits of the invention are several. First is to deliver substantial capital expenditure savings to a vehicle rental service business, as the soft-configured vehicle can be soft configured into a vehicle of varying features. This therefore diminishes the need by the rental company to stock a wide range of different vehicles, reducing not only expenditure on the vehicles themselves, but also on the amount of garaging or real-estate needed to store those vehicles. The second main benefit is that the soft-configured vehicle can create an additional facility for customers to adapt the vehicle to their requirements. That is, after a customer has claimed the key and started using the vehicle, further features can still be paid for and activated on the move by the customer. To assist this process, personalized information can also be applied to a customer, according to the way in which they use the rented vehicle. As well as being convenient, this can improve safety, for example by offering to assist a driver who is tired or unwell. The third main benefit is to automate at least part of a formerly manual task: because of the soft configurability of the vehicle, the configuration information can be loaded to the vehicle wirelessly and seamlessly, through a non-human-intervention process, saving time, cost and errors.

BRIEF DESCRIPTION OF THE DRAWINGS

Reference is made, by way of example only, to the accompanying drawings which are as follows.

DETAILED DESCRIPTION

In general, unless otherwise indicated, the embodiments described below are to be applied to vehicle (e.g. car) rental services, which involve at least a passenger vehicle made available to a customer through rental services, a car rental agency, and a customer making the rental request.

Embodiments of the present invention introduce the idea of "soft-configured vehicles", for application to the vehicle rental service industry. The term "soft-configuration" refers to a vehicle capable of being configured to the equivalent of multiple vehicles in terms of the features they have. The configuration process is regarded as "soft", as it is carried out via software rather than via additional hardware installation. A soft-configurable vehicle typically has been installed with a common set of hardware, which supports a number of optional features/functions, as shown in FIG. 1.

Figure 1:
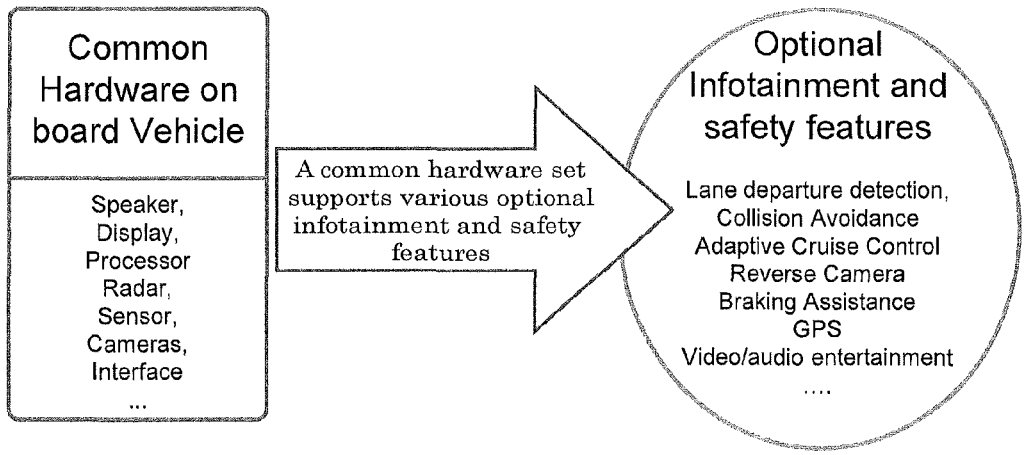
FIG. 1 illustrates the principle of providing optional vehicle features based on common hardware.

For example, as shown in the left-hand portion of FIG. 1, the hardware installed can include speakers, monitor/display, computer processors, radar, sensors, cameras, human interface etc. With this set of common hardware and with assistance from some mechanical parts, a range of infotainment and safety features can be supported as listed in the right-hand part of FIG. 1, such as lane departure detection, collision avoidance, adaptive cruise control, parking assistance, reversing camera, etc.

Despite the whole set of features and functions being realizable in every such soft-configurable vehicle, such add-on features/function will only actually be available to a customer by the means of activation and deactivation, when a customer pays for the add-ons. In contrast to the conventional scenario, where a rental company has to keep in stock a multitude of vehicles with various models to meet customers' requirement, the proposed service solution has the potential to reduce the capital expenditure on acquiring vehicles.

Figure 2:
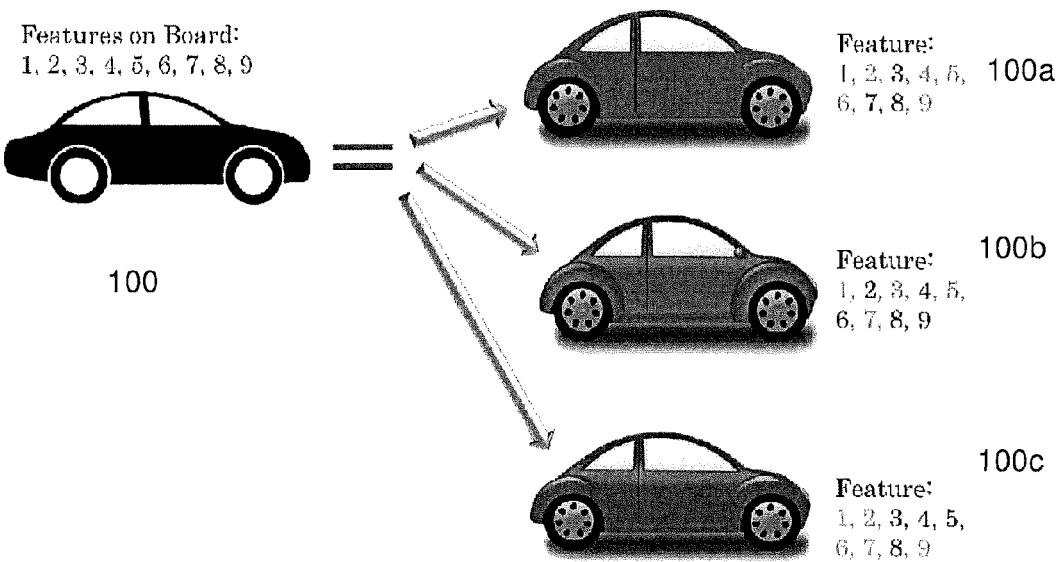
FIG. 2 illustrates how various vehicles having different configurations may be soft-configured from the same vehicle.

Referring now to FIG. 2, a rental fleet of soft-configured rental vehicles 100 will therefore only need to have a limited number of vehicles in order to maintain availability of various models and configurations of vehicles 100a, 100b, 100c, giving seemingly the capability of a much larger sized fleet. That is, among the features and functions 1 to 9 potentially configurable in vehicle 100, vehicle 100a is soft-configured with the set of features/functions 1, 3, 7 and 8, vehicle 100b with a different set of features 2, 4, 6, 8 and 9; and vehicle 100c with a third feature set 3, 4, 5, and 8.

Figure 3:
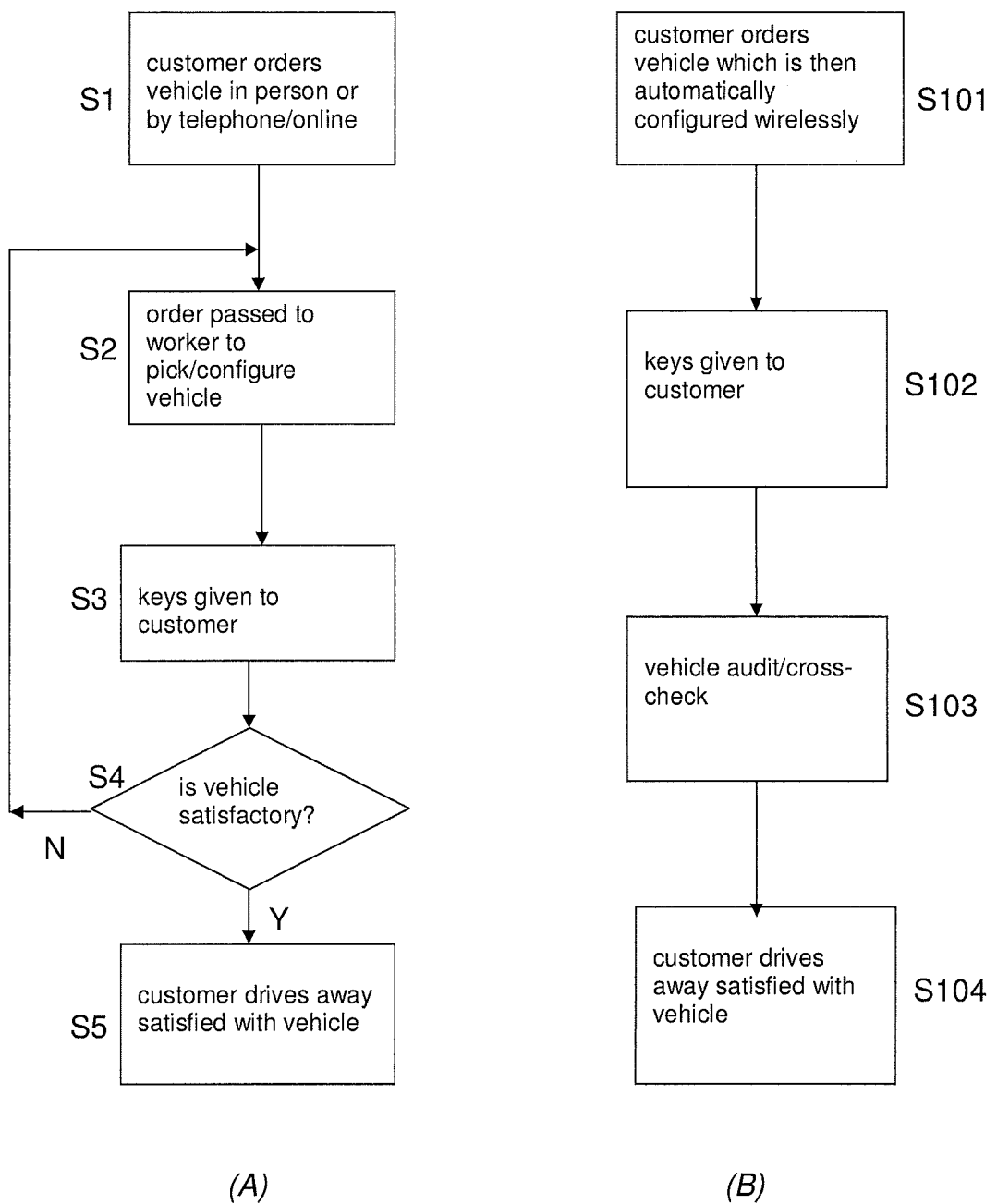
FIG. 3(A) is a flowchart of operations in a conventional method of vehicle rental.
FIG. 3(B) shows corresponding operations in a method embodying the invention.

FIG. 3 illustrates the difference between the conventional rental method, and that adopted in embodiments of the present invention.

In the conventional process shown in FIG. 3(A), first in operation S1 a customer orders a vehicle for rental in any of various ways, with online ordering becoming increasingly popular. Conventionally, however, this order is then handled manually regardless of how it was made. That is, in operation S2 the order is printed out on paper and handled to a staff member of the rental company, who then finds a suitable vehicle, and (so far as this is possible) manually performs any configuration needed to meet the customer's requirements. Then in operation S3, the keys of the vehicle are handed over to the customer who looks over the vehicle (operation S4). It is possible that the customer may decide the vehicle is unsatisfactory, for example because the staff member could not find an appropriate vehicle having the desired features. In this case (S4, "N)") the order has to be processed again. In S5, once the customer is satisfied (S4, "Y") he/she drives away in it.

Contrasting this with the process of the invention outlined in FIG. 3(B), the customer orders the vehicle in operation S101. The order is converted into a configuration message which is wirelessly communicated to a processing and communication unit of the vehicle, as described in more detail below. Receipt of the configuration message causes the processing and communication unit automatically to soft-configure one or more features or functions of the vehicle. Then in S102 the keys are given to the customer. The soft-configuration having been performed automatically, there may be some assurance that the required functions are now configured but to confirm this, a vehicle audit or cross-check may be performed at S103. The customer then drives the vehicle away in S104.

This technical solution has the added benefit of allowing customers to pay a lower entry cost for the vehicle with basic functions, and the customers will know there are other advanced features available. If the customer is interested and pays an additional fee, these features can be wirelessly activated even after the customer has already taken control of the vehicle. A trial period of certain futures will also be possible, and it is more convenient since a customer has already taken control of the vehicle, and the vehicle usage time is within the customer's paid rental time.

Figure 4:
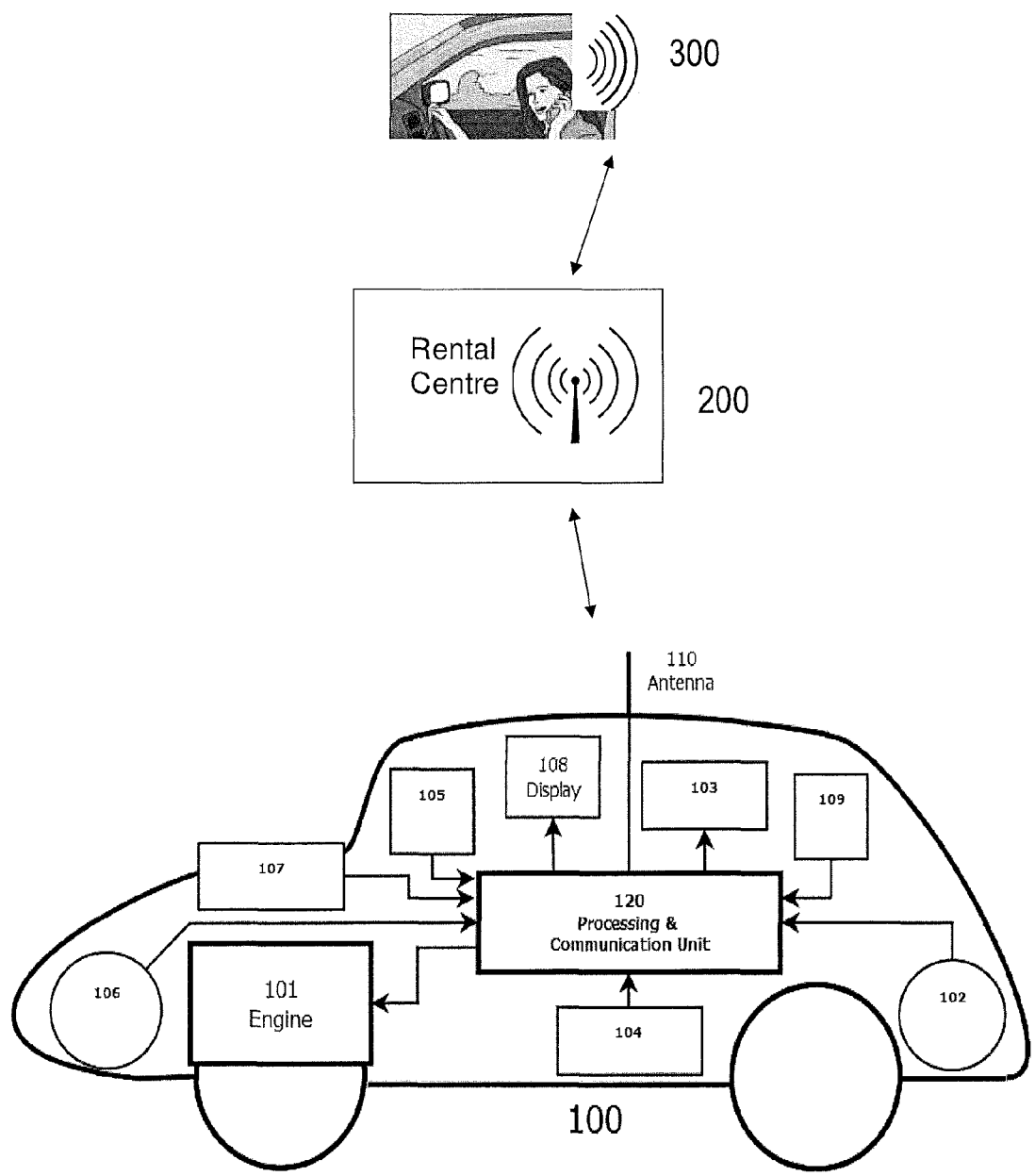
FIG. 4 illustrates functional units of a vehicle, as well as on-the-move soft configuration in accordance with an embodiment.

FIG. 4 illustrates this principle, where a customer 300 has already started renting the vehicle but decides she would like an additional function, a navigation system for example. She uses her mobile phone to contact the rental center 200, either by placing a voice call to a human operator or (preferably) by using an application (app) on the phone to order the new function. In either case, the rental center 200 converts her request into a configuration message for the vehicle 100 which (in this example) is wirelessly communicated directly to a control unit (processing and communication unit 120) of the vehicle in order to activate the requested function. In this example the processing and communication unit would configure a display 108 of the vehicle to show a map where previously this function was locked (unavailable). In the case of using a mobile phone app the request can be automatically translated into the configuration message, and the necessary payment taken, without the need for manual labor.

The process in embodiments will now be described in more detail.

It is assumed that vehicles can wirelessly communicate with a rental center by some means, or in other words that V2X communication is possible. Existing cellular networks may be used for this, using the customer's phone as an anchor point with an in-vehicle communications link to the car, plus necessary security and authentication mechanisms. Alternatively, as the above mentioned DSRC becomes widely adopted, this will provide the required V2X communication ability. This will particularly be the case in future "smart cities" where V2X infrastructure is expected to be widely available at least in urban areas.

Input of commands is preferably performed wirelessly, for the reason of convenient usage, and easy configuration. This allows the vehicles connected wirelessly to the agency's garage to be automatically configured once a customer's requirement for features is noted. This process shortens the time and cost involved, compared to configuring the vehicles manually.

Thus, the message may specify:
the vehicle for which the message is intended
the feature(s) to be activated
the duration for which the specified feature(s) should be effective, such as one week or one day
security or authentication information to prevent unauthorized activation of features.

As mentioned earlier, the vehicle will commonly be equipped with a number of features and functions that can accept such way of activation and deactivation.

Examples of such optional features include:
(i) Infotainment functions such as any of:
navigation and GPS mapping
audio entertainment
video entertainment
traffic information
(ii) Safety assistance functions such as any of:
lane departure warning
collision avoidance
rear view camera
automatic parking
adaptive cruise control
traction control
night vision
self-drive mode
(iii) Driver comfort features such as:
air conditioning
seat heating
seat massage
(iv) Driving performance features such as:
additional drive modes—"sport" or four-wheel drive
off road ability (four-wheel drive, height adjustment)
ability to turn off traction control
ability to turn off a speed limiter Preferably, the vehicle control unit (see below) is configured to compare the current time with the effective period of a configuration message. If the duration specified in the configuration message has expired, the processing and communication unit may automatically reset the vehicle to a baseline configuration in which optional features are disabled.

Possible wireless activation methods include the following.

As a first technique, Dedicated Short Range Communications (DSRC) developed for car to car (C2C) and car to infrastructure (C2X) communications can be adopted. With the aid of DSRC, and expected large scale deployment in the car industry, a car can be seen as "always wirelessly connected". Given this advantage, not only a customer's initial choice of features can be wirelessly transmitted to a vehicle in a fully automated manner, but also the associated mobile payment and features activation services can also be conducted through the DSRC connections. For example, a smartphone of the driver may be used to send an instruction to the rental center, in response to which the rental center sends a message to the vehicle via V2V/V2X, which message can use DSRC.

Alternatively, NFC (Near Field Communication) technology can be adopted. A programmable NFC tag can be integrated/tagged onto a rental vehicle's key, with a NFC reader installed near the ignition keyhole area. When the rental company receives a customer request for certain type of vehicle with certain features, the activation information will programmed on the NFC tagged car key. When a customer starts the car with the key, the car wirelessly receives the information and the processing and communication unit causes the selected features to be activated.

The programmable NFC tag can also be used as a bridge to allow customers to pay for additional features, with some assistance from their NFC compatible smart phones. The rental agency publishes a feature paying app on the Apple App Store and/or the Android Play Store. After proper authentication procedure and making the payment, a customer can program the NFC tag in order to activate further features. This process can happen entirely on the move, without a customer having to go back to the rental agency's premises in the traditional way to "swap" for a different vehicle with different features. This kind of wireless convenience provides for additional convenience for users, compared to the conventional process of FIG. 3(A) in which a customer's choice of model and features are made before they have access to the vehicle. Now the customers can acquire additional features for their use of the vehicle, during the whole rental period.

Some further detail will now be given of the soft-configurable vehicle, again with reference to FIG. 4. In this example, the vehicle is configured via V2X/V2V wireless communication rather than using NFC.

As shown in FIG. 4, the vehicle 100 is equipped with an antenna for wireless communication over the V2X/V2V network, and thus capable of receiving a configuration message from the rental center 200 (as well as transmitting a status report, confirmation message and the like). All communication is under the supervision of a processing and communication unit 120 which is further responsible for security checks (authenticating messages from the rental center) and for performing the soft-configuration of functional units of the vehicle. In addition to influencing aspects of the operation of an engine 101, the processing and communication unit is connected to a display 108, capable of providing entertainment or navigation functions for example; and to any of the functional blocks such as a rear-facing radar 102, GPS receiver 103, seat actuator 104, loudspeaker system 105, front-facing radar 106, and night-vision camera 107. These functional blocks are listed by way of example only, and other possibilities will occur to those skilled in the art. The processing and communication unit 120 may be linked to other parts of the vehicle such as the brakes, gear-train and steering. It may even be possible for the processing and communication unit 120 to take over operation of the vehicle completely, to provide a "self-drive" mode in which the user no longer has to drive the vehicle.

As may be appreciated, electronics accounts for an increasing proportion of the cost of a car, and the vehicles within a range are to some extent differentiated by programming as much as by engineering. The additional hardware cost of some features may be insignificant, so that it may be cheaper to provide a common hardware platform and leave some functions unused, rather than create a separate system for each model in the range. This trend makes possible the soft-configuration of the vehicle referred to earlier.

More particularly, soft-configuration involves the processing and communication unit 120 altering its own programming, or that of other functional blocks which are under software control, in order to activate functions which are currently locked or dormant. In some cases this may be possible without any changes on the part of the vehicle manufacturer; in other cases, the vehicle manufacture may need to adapt the vehicle to make it suitable for the soft-configuration in accordance with the present invention. This may be worthwhile for the manufacturer if it makes the adapted vehicles more attractive to rental companies, allowing a sufficient number of such vehicles to be sold.

To take night-vision for example, it may be cost-effective for the manufacturer to install an infrared camera 107 into every vehicle of a certain model; then in accordance with the invention this camera is either left unused in the basic configuration, or if the customer is willing to pay for the night-vision function, the camera 107 is activated and the necessary processing is handled by the processing and communication unit 120 in order to display a night vision image on the display 108.

With an "always wirelessly connected" vehicle as mentioned above, the possibility of mobile payment and features activation on the move will also provide an opportunity for actively offering additional features after the vehicle rental has already started. If a customer is already using a rented vehicle, the V2V/V2X network (or the user's mobile network) can be used to gather statistics on how the vehicle is being driven. In this way the user's driving habit, driving route and other personalized intelligence can be made available to the rental center (and/or to the vehicle), therefore facilitating a decision to offer additional features/options.

Therefore, a further function of the processing and communication unit 120 (in one embodiment) is to monitor use of the vehicle and report back to the rental center. For example, such parameters as speed, fuel consumption, use of brakes, night driving and so forth may be recorded and fed back to the rental center. This allows the rental center to determine patterns of use of the vehicle which can prompt information messages on additional functions which may be of interest to the customer. As one example, the information fed back to the rental center (such as sudden use of the steering wheel) may indicate that the driver is tired or unwell, leading to an offer to activate driver assistance or self-drive features.

Alternatively, the decision is made at the vehicle itself, (which then notifies its decision to the rental center, via DSRC for example).

The rental center stores the configuration which it has instructed for the vehicle, allowing the stored configuration to be compared with one reported by the vehicle. An automated configuration cross-check/audit may be carried out before the rental vehicle exits the car rental yard (e.g.: at the exit gate). Furthermore, at any time during the rental period configuration cross-check/audit may be carried-out remotely (either on demand, randomly, periodically or combinations thereof). Each audit requires verification of current configuration in use with the actual purchased (or paid for) configuration, so as to prevent unauthorized addition of features by hackers. Verification might permit the actual configuration to include fewer features than those paid for, in case any feature has been deactivated by the user for some reason.

Both type of audit are preferably carried out automatically and wirelessly, using V2X or V2V communication (NFC might alternatively be used for the initial audit at the rental center). The transaction involves a configuration signature (that can uniquely characterize the current configuration that is active/enabled on the vehicle and/or the key fob) to returned to a verification server where the two would be compared. Any differences would be alerted to the car rental staff (or an automated system) to take appropriate actions to resolve the discrepancy.

Thus, to summaries, embodiments of the present invention provide a method of vehicle rental permitting soft-configuration, by providing a rental vehicle (100) having a range of optional infotainment and safety assistance features available which can be activated or deactivated through wireless software configuration. The vehicle picking and configuration process is automated by generating a configuration message at a rental center (200) and transmitting this wirelessly to the destination vehicle, taking advantage of the vehicle's soft configuration flexibility. Additional features can be purchased and activated on-the-move; that is, after a customer (300) has paid for an initial set of features and started to use the vehicle, further features can be both paid for and activated wirelessly. This includes the features of actively promoting available features on the basis of vehicle usage.

Various modifications are possible within the scope of the invention.

Although an embodiment has been described with reference to a vehicle in the form of a car, the present invention is not restricted to such use and may be applied to any kind of road vehicle. Similarly, whilst the present invention is most applicable to vehicles driven on the public road network, the present invention is not necessarily restricted to such use.

A "rental center" has been referred to above, which corresponds to the "control center" of the claims. Although it may be convenient to think of the rental center as being the same as the rental office where the customer collects the vehicle, this is not necessarily the case. For example a chain of rental businesses may have one rental center handling all incoming requests.

Whilst in the above embodiments, configuration of the vehicle occurs automatically, this is not necessary essential, and it would be possible to provide optional features which depend partly or wholly on manual intervention, by an employee of the rental center. In this case the configuration message would provide a guide for any manual configuration that might be needed.

References above to "GPS" are to be understood as covering any kind of satellite-based positioning system.

Any of the embodiments and variations mentioned above may be combined in the same system. Features of one embodiment may be applied to any of the other embodiments.

In any of the aspects or embodiments of the invention described above, the various features may be implemented in hardware, or as software modules running on one or more processors.

The invention also provides a computer program or a computer program product for carrying out any of the methods described herein, and a computer readable medium having stored thereon a program for carrying out any of the methods described herein.

A computer program embodying the invention may be stored on a computer-readable medium, or it may, for example, be in the form of a signal such as a downloadable data signal provided from an Internet website, or it may be in any other form.

It is to be understood that various changes and/or modifications may be made to the particular embodiments just described without departing from the scope of the claims.

INDUSTRIAL APPLICABILITY

The present invention reduces the hardware investment required to provide a vehicle rental service, because one vehicle may be soft-configured to provide a range of vehicles of differing capabilities. The present invention therefore has environmental benefits in terms of avoiding unnecessary vehicle purchases and reducing the amount of parking space required for rental vehicles. At the same time, the present invention contributes to safe and enjoyable transport of users by allowing desired vehicle functions, including additional safety functions, to be provided even after a rental period has already begun. Finally, the present invention can reduce the need for manual labor, saving time, cost and errors, by soft-configuring a vehicle automatically in response to a configuration message.

The invention claimed is:

1. A method of wirelessly configuring a vehicle for enabling use by a user of a specified function for a specified time period, comprising:
   receiving a request at a control center from the user to configure the vehicle, the request specifying at least one function which the user wishes to have available, and generating a configuration message for wireless communication to the vehicle in response to the request, the configuration message specifying a time period for activation of the specified function; and
   wirelessly receiving the configuration message at a control unit of the vehicle and activating the specified function of the vehicle for the specified time period in response to the configuration message.

2. The method according to claim 1 further comprising
   transmitting the request to configure the vehicle from a mobile device of the user; and
   wirelessly receiving the request at the control center.

3. The method according to claim 1 wherein transmitting the request occurs during use of the vehicle by the user.

4. The method according to claim 1 wherein the configuration message is stored in a storage medium linked to a near-field communication device and wirelessly transmitted from the near-field communication device to the vehicle.

5. The method according to claim 1 wherein the configuration message is wirelessly transmitted from the control center to the vehicle over a wireless communication network selected from the group consisting of Dedicated Short Range Communications (DSRC), and network.

6. The method according to claim 1 wherein the setting is performed automatically without human intervention.

7. The method according to claim 1 further comprising the vehicle, after the setting, reporting its configuration to the control center; and
   the control center comparing the reported configuration with a configuration contained in the configuration message.

8. The method according to claim 1 wherein the configuration message specifies one or more of:
   the vehicle for which the message is intended;
   the at least one function to be activated.

9. The method according to claim 1 wherein the at least one function of the vehicle includes an infotainment function and is selected from the group consisting of:
   navigation,
   audio entertainment,
   video entertainment, and
   traffic information.

10. The method according to claim 1 wherein the at least one function of the vehicle includes a safety assistance function and is selected from the group consisting of:
    lane departure warning,
    collision avoidance,
    parking assistance,
    rear view camera,
    adaptive cruise control,
    traction control, and
    self-drive capability.

11. The method according to claim 1 wherein the at least one function of the vehicle relates to driver comfort and is selected from the group consisting of:
    air conditioning,
    seat heating, and
    seat massage.

12. The method according to claim 1 wherein the at least one function of the vehicle relates to driving performance and is selected from the group consisting of:
    drive modes,
    offroad ability,
    traction control, and
    speed limiter.

13. The method according to claim 1 further comprising:
    monitoring use of the vehicle at the control center and transmitting a personalized information message to the user on the basis of their use of the vehicle.

14. A system for wirelessly configuring a vehicle to enable use by a user of a specified function for a specified time period, comprising:
    a mobile device of the user that is configured to transmit a request to configure the vehicle, the request specifying at least one function which the user wishes to have available;
    a control center that is configured to receive the request and to provide a configuration message for wireless communication to the vehicle in response to the request, the configuration message specifying a time period for activation of the specified function; and
    the vehicle, which is configured to wirelessly receive the configuration message and to activate the specified function of the vehicle for the specified time period in response to the configuration message.

15. A vehicle comprising:
    functional units each arranged to be either in an activated state for providing at least one function, or in a deactivated state; and
    a control unit capable of being configured selectively to activate one or more of the functional units; and
    a wireless receiver; wherein
    the control unit is responsive to a configuration message received by the wireless receiver to activate a functional unit in order to provide the at least one function for a time period specified in the configuration message.

16. A mobile device for configuring a rented vehicle to enable use by a user of a specified function for a specified time period, comprising:
    a receiver for a wireless communication network; and
    a transmitter for near-field communication (NFC);
    the mobile device configured to, in response to receiving a first message over the wireless communication network from a vehicle rental center, construct a second message specifying at least one function which the user wishes to have available and specifying a time period for activation of the specified function, and transmit the second message by NFC to a NFC receiver of the vehicle to configure the vehicle by activating the specified function for the specified time period.

* * * * *